(12) United States Patent
Mayer et al.

(10) Patent No.: US 7,059,770 B2
(45) Date of Patent: Jun. 13, 2006

(54) GUIDE RAIL FOR A LINEAR BEARING

(75) Inventors: Uwe Mayer, Münnerstadt (DE);
Ludwig Edelmann, Sulzthal (DE);
Henryk Velde, Werneck (DE); Anita Gransow, Sennfeld (DE)

(73) Assignee: AB SKF, Goteborg (SE)

( * ) Notice: Subject to any disclaimer, the term of this patent is extended or adjusted under 35 U.S.C. 154(b) by 161 days.

(21) Appl. No.: 10/795,357

(22) Filed: Mar. 9, 2004

(65) Prior Publication Data
US 2004/0184686 A1   Sep. 23, 2004

(30) Foreign Application Priority Data
Mar. 10, 2003   (DE) ................. 103 10 324

(51) Int. Cl.
*F16C 29/04*   (2006.01)
(52) U.S. Cl. .......................... 384/55; 384/59
(58) Field of Classification Search ................. 384/59, 384/55, 50, 49, 43–45
See application file for complete search history.

(56) References Cited

U.S. PATENT DOCUMENTS

| | | | |
|---|---|---|---|
| 3,591,906 A | | 7/1971 | Leiber |
| 4,304,443 A | * | 12/1981 | Hoffmann .................. 384/45 |
| 4,615,569 A | * | 10/1986 | Hirata ........................ 384/45 |
| 4,656,881 A | | 4/1987 | Goedecke |
| 5,067,823 A | * | 11/1991 | Kasuga ...................... 384/45 |
| 5,380,099 A | * | 1/1995 | Teramachi .................. 384/45 |
| 5,640,768 A | | 6/1997 | Teramachi |
| 6,052,902 A | * | 4/2000 | Lyon ......................... 384/55 |
| 2001/0028130 A1 | | 10/2001 | Yagi |

FOREIGN PATENT DOCUMENTS

| | | |
|---|---|---|
| DE | 10 46 415 A | 12/1958 |
| DE | 24 06 046 A1 | 8/1975 |
| DE | 34 36 977 A1 | 4/1986 |
| DE | 44 24 840 A1 | 1/1996 |
| DE | 297 01 809 U1 | 6/1998 |
| DE | 100 52 848 A | 5/2002 |
| DE | 201 15 504 U1 | 2/2003 |
| EP | 05 58 761 A1 | 9/1993 |

OTHER PUBLICATIONS

Worm, M., "Spezial zur Bildung genauer Auflageflächen, Bohrungen, zum Festiegen von Maschinenteilen." F7, 1974, pp. 33-40.

* cited by examiner

*Primary Examiner*—Thomas R. Hannon
(74) *Attorney, Agent, or Firm*—Buchanan Ingersoll

(57) ABSTRACT

A guide rail for a linear bearing has at least one rail element with a guideway for rolling bodies. The rail element is connected to a plastic body or borders the plastic body, with the plastic body forming the base body of the guide rail. To increase the precision of the guide rail, especially when used in an environment involving a wide temperature range, the rail element is connected to a metallic support frame which is surrounded at least partially by the material of the plastic body.

19 Claims, 4 Drawing Sheets

GUIDE RAIL FOR A LINEAR BEARING

This application is based on and claims priority under 35 U.S.C. § 119 with respect to German Application No. 103 10 324.4 filed on Mar. 10, 2003, the entire content of which is incorporated herein by reference.

FIELD OF THE INVENTION

This invention generally relates to linear bearings. More particularly, the present invention pertains to a guide rail for a linear bearing having at least one rail element with a guideway for rolling bodies, with the rail element being connected to a plastic body or bordering it and the plastic body forming the base body of the guide rail.

BACKGROUND OF THE INVENTION

Guide rails for linear bearings have long been known in the art. Such known guide rails typically have a base body formed from a plastic molding in which there is at least one rail element. The rail element consists of steel and has a ground, drawn or rolled guideway for the rolling bodies of the linear bearing.

The hybrid combination of the plastic body on one side and the rail element on the other side yields a relatively light component which is made rather strong at the point at which it must have great hardness, specifically in the area of the guideway for the rolling bodies. In order to build a light and economical linear guide, therefore, a steel rail is inserted in the plastic base body to increase the bearing number.

In the production of typical guide rails, the steel rail element is inserted into an injection molding tool and then extrusion-coated with plastic material so that only the side of the rail element which has the guideway of the rolling bodies remains free of plastic. Thus, relatively high precision can be achieved insofar as the spacing of two rail elements of a guide rail which are extrusion-coated at the same time with plastic.

In known guide rails such as those described above, it has proven disadvantageous that they do not have the required strength in operation. The inserted steel rail which acts as a rail element with the guide track for the rolling bodies does have sufficient strength. However, especially when the linear bearing is used at elevated temperatures, flow phenomena in the plastic occurs and this can greatly reduce the overall stiffness of the guide rail.

SUMMARY OF THE INVENTION

According to one aspect of the invention, a guide rail for a linear bearing comprises at least one rail element provided with a guideway for rolling bodies, with the at least one rail element being connected to or bordering a plastic body which forms a base body of the guide rail. The rail element is connected to a metallic support frame which is surrounded at least partially by material forming the plastic body.

The guide rail has relatively great strength in operation while having only small changes of geometry, especially with respect to the location of the rail element connected to or bordering the plastic base body, even when used in a wide temperature range.

Preferably the guide rail has two or more rail elements which are each surrounded at least partially by the material of the plastic body. In the case in which there are two rail elements, it is preferable that the two rail elements be located on opposing end areas of the plastic body. In addition, the rail element(s) and the support frame are preferably extrusion-coated with the material of the plastic body. Alternatively, the rail elements can be connected to the plastic body via a snap connection.

A relatively high precision of the guide rail is achieved when the support frame has defined surfaces for the contact of the rail element(s) so that the positioning of the rail element(s) at a relatively exact defined position is made possible.

In connection with the illustrated and described embodiment, the overall guide rail is relatively light and economical to produce, and possesses relatively high stiffness due to the metallic support frame which is provided and which is connected to the rail element(s).

In the case in which the guide rail is provided with two essentially oppositely positioned rail elements, the preferably extrusion-coated metallic support frame supports the two rail elements and keeps them spaced apart relatively precisely. As a result, even at the high temperatures to which the guide rail is exposed, a relatively high geometrical constancy is achieved with respect to the spacing of the rail elements and thus of the guideways for the rolling bodies.

According to another aspect of the invention, a linear bearing guide rail comprises a pair of rail elements each possessing a guideway for rolling bodies, with the two rail elements being arranged so that the guideways of the two rail elements face away from one another, a metallic support frame connected to each of the rail elements to maintain the two rail elements at a defined distance from one another, and a plastic body bordered by or connected to the pair of rail elements and forming a base body of the guide rail, with the metallic support frame being at least partially surrounded by material forming the plastic body.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION

Figure 1:
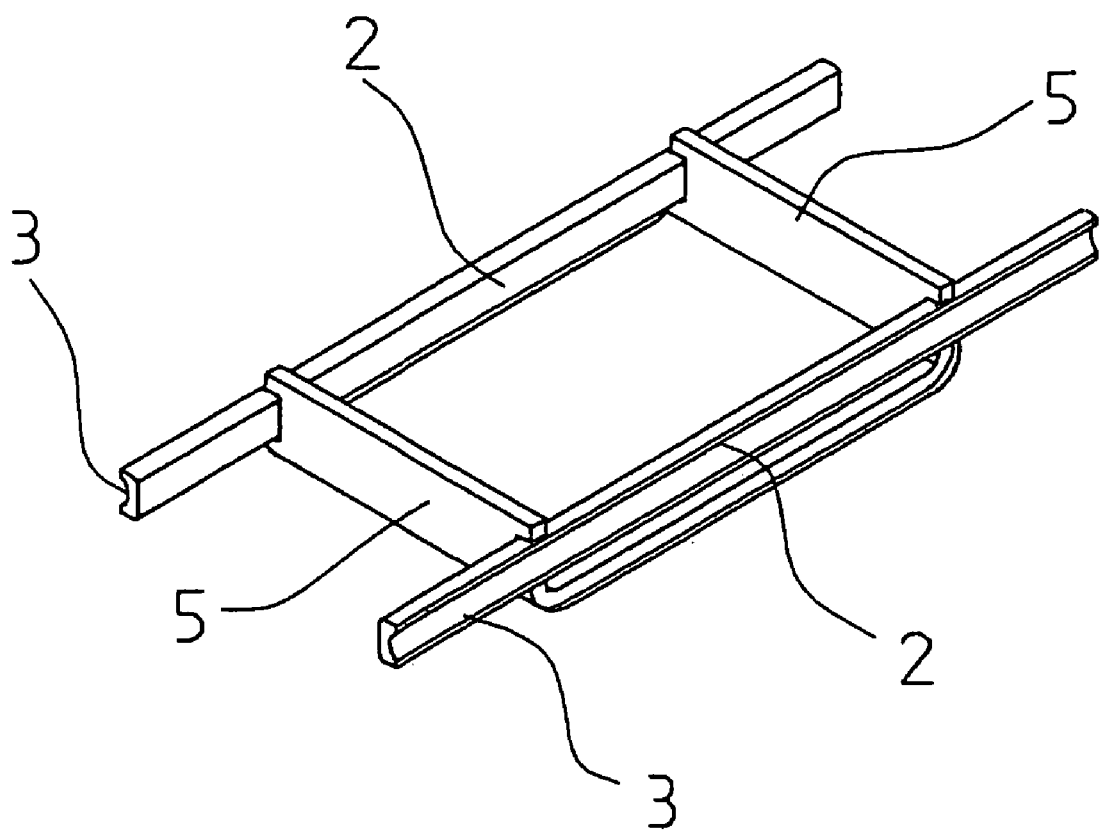
FIG. 1 is a perspective view of two rail elements kept at a distance by a support frame to form a part of a guide rail in accordance with an embodiment of the present invention.

With reference initially to FIG. 1, the guide rail 1 which is to be produced according to an embodiment of the present invention is comprised of two rail elements 2 positioned parallel to one another and in opposing relation to each other. Each rail element 2 has a guideway 3 for rolling bodies (e.g., balls). The guideway 3 can be ground, drawn or rolled precisely into the respective rail element 2.

As can be seen in FIG. 1, in a first portion of the fabrication process for producing the guide rail, the two rail elements 2 are inserted into a support frame 5. The support frame 5 is made of metal, for example steel or aluminum, and has surfaces described in more detail below for precise accommodation of the rail elements 2. These accommodation surfaces are made rectangular in cross-section and correspond to the cross-sectional shape of the respective portion of the rail elements 2.

Figure 2:
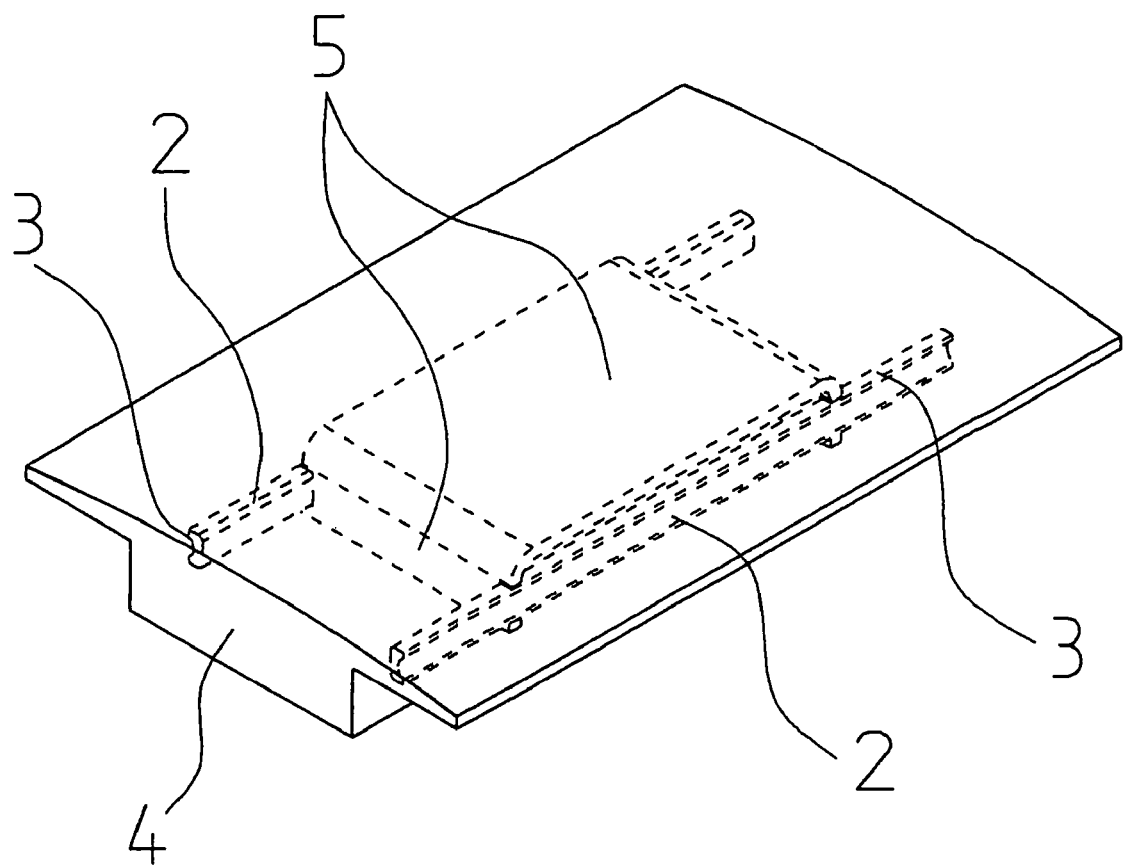
FIG. 2 is a perspective view of the arrangement shown in FIG. 1 after the arrangement has been extrusion-coated with plastic.

After prior mounting of the arrangement as shown in FIG. 1, the arrangement is inserted into an injection molding tool. The injection molding tool, by virtue of its cavity, defines a molding which corresponds to the outer contour of the guide rail 1 which is to be fabricated. After injecting the plastic material into the cavity of the injection molding tool, the plastic surrounds both the rail elements 2 and also the support frame 5 so that the body which is shown in FIG. 2 is formed. The support frame 5 is at least partially surrounded by the plastic material. In the illustrated embodiment shown in FIG. 2, the support frame is completely extrusion-coated with plastic, while the rail elements 2 remain free of plastic material simply on the side facing away from the support frame 5, with this side of the rail elements 2 bearing the guideway 3 for the rolling bodies. In the illustrated embodiment, the two rail elements 2 are located on opposing end areas of the plastic body 4.

The guide rail 1 is consequently determined in terms of the outer contour essentially by the plastic body 4 which is matched to the function of the guide rail 1.

Figure 3:
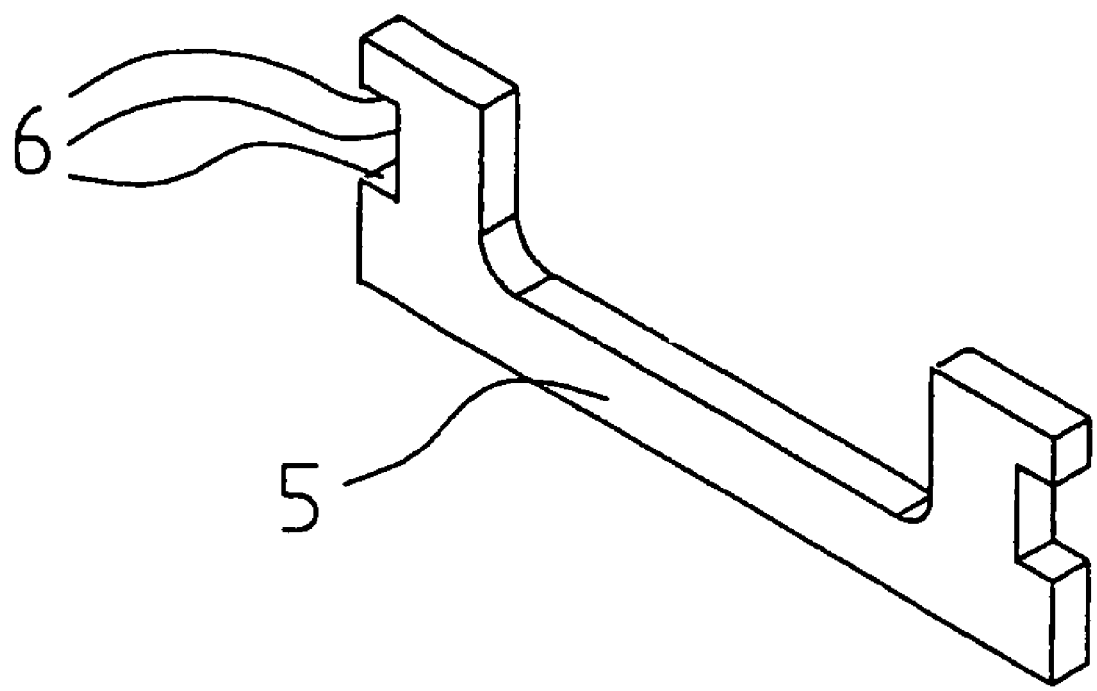
FIG. 3 is a perspective view of the support frame shown in FIG. 1.

FIG. 3 illustrates a support frame 5 which can be used to keep the two rail elements 2 at a distance. The support frame 5, as already explained above, has two rectangular recesses facing away from one another for holding the rail elements 2. Here the defined surfaces 6 defining the recesses are ground into the support frame 5 such that when the rail elements 2 are inserted they are held in a very exact position relative to one another.

This results in that even during major temperature fluctuations in later use of the linear bearing, the two rail elements and thus the guideways for the rolling bodies are kept at a relatively exact or precise distance and so this function need no longer be assumed solely by the plastic body 4 as in the case of prior known guide rails.

The described embodiment of the guide rail for a linear bearing thus has generally higher precision in operation, but nevertheless can be economically produced.

The described embodiment of the guide rail also has relatively high stiffness in spite of low weight, this being produced at least in part by a type of framework formed by the rail elements 2 and the support frame 5 with one another. Diverse additional functions can be integrated into the proposed guide rails.

The relatively imprecise and unstable guides made of plastic are thus efficiently reinforced, without it being necessary to produce the base bodies from expensive material (e.g., aluminum or magnesium) which would otherwise require costly machining processes (e.g., cutting). The proposed guide rail can thus be produced quite economically.

The embodiment of the guide rail describe above is especially well suited as a stiff linear guide, for example for use in a motor vehicle where both economical production and also low weight are important.

Figure 4:
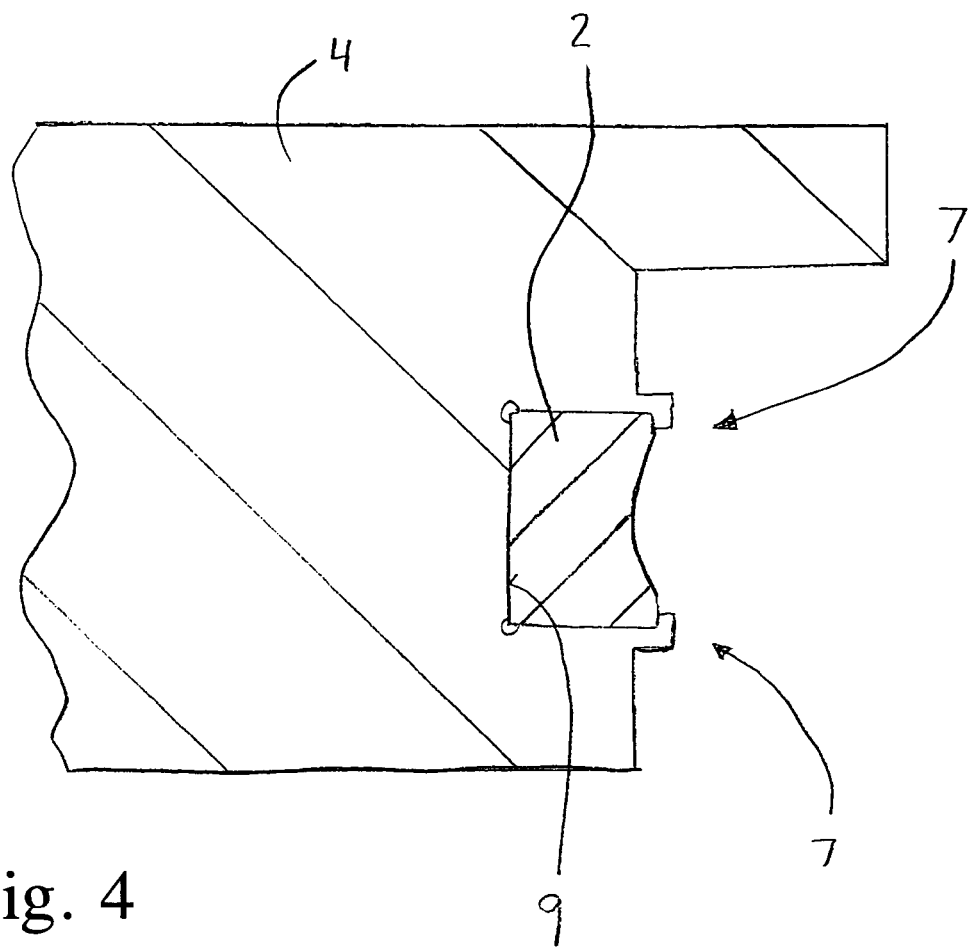
FIG. 4 is a cross-sectional view of the plastic body and rail element illustrating a snap connection between the plastic body and the rail element.

It is also possible, as an alternative to the construction described above, to connect the rail elements to the plastic body in a different way. FIG. 4 shows one such alternative in which a snap connection 7 between the rail elements 2 and the plastic body 4 is employed. Here, the plastic body 4 is provided with a groove 9 having a shape configured to receive the rail element 2, with a similar groove being provided to receive the other rail element. The plastic body 4 is configured in the manner illustrated so that finger portions of the plastic body overlie the rail element 2 to provide the snap connection 7.

Figure 5:
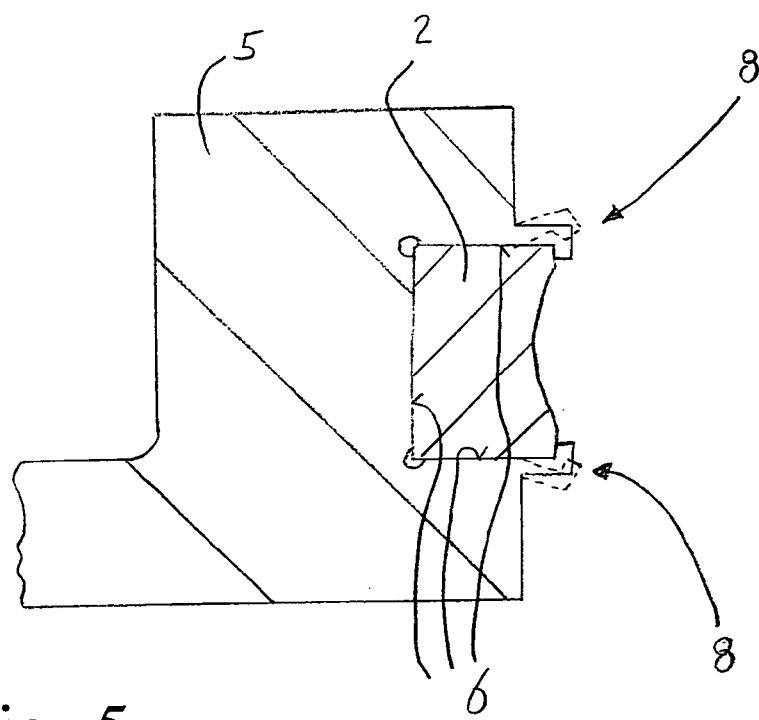
FIG. 5 is a cross-sectional view of the support frame and rail element illustrating a snap connection between the support frame and the rail element.

A snap connection 8 can also be used to connect each of the rail elements 2 to the support frame 5 as illustrated in FIG. 5. The surfaces 6 of the support frame 5 define a groove that receives the rail element, with a similar groove being provided in the support frame 5 to receive the other rail element 2. FIG. 5 illustrates the way in the which the support frame 5 is configured so that finger portions of the support frame 5 overlie the rail element 2 to provide the snap connection 8. FIG. 5 also depicts in the dotted line configuration the way in which the finger portions of the support frame deflect outwardly when the rail elements 2 are inserted into the groove defined by the surfaces 6. A similar deflection occurs in the case of the finger portions of the plastic body 4 upon insertion of the rail elements 2. Once the rail elements 2 have been inserted into the respective grooves, the finger portions deflect back to overlie the rail elements 2.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A linear bearing guide rail comprising:
a pair of rail elements each possessing a guideway for rolling bodies, the two rail elements being arranged so that the guideways of the two rail elements face away from one another;
a metallic support frame connected to each of the rail elements to maintain the two rail elements at a defined distance from one another; and
a plastic body bordered by or connected to the pair of rail elements and forming a base body of the guide rail, the metallic support frame being at least partially surrounded by material forming the plastic body, wherein the rail elements and the metallic support frame are separate parts.

2. The linear bearing guide rail according to claim 1, wherein the two rail elements are located on opposing end areas of the plastic body.

3. The linear bearing guide rail according to claim 1, wherein the two rail elements and the metallic support frame are extrusion-coated with the material of the plastic body.

4. The linear bearing guide rail according to claim 1, wherein the two rail elements are connected to the plastic body via a snap connection.

5. The linear bearing guide rail according to claim 1, wherein the support frame is connected to each of the rail elements via a snap connection.

6. The linear bearing guide rail according to claim 1, wherein the support frame possesses a pair of recesses each receiving one of the rail elements.

7. The linear bearing guide rail according to claim 6, wherein the recesses in the support frame are rectangular.

8. The guide rail according to claim 1, wherein the rail elements and metallic support frame are assembled to one another before attaching the plastic body.

9. A guide rail for a linear bearing comprising at least one rail element provided with a guideway for rolling bodies, the at least one rail element being connected to or bordering a plastic body which forms a base body of the guide rail, the rail element being connected to a metallic support frame which is surrounded at least partially by material forming the plastic body, wherein the rail element and the metallic support frame are separate parts.

10. The guide rail according to claim 9, wherein the at least one rail element is a first rail element, and further comprising a second rail element.

11. The guide rail according to claim 10, wherein the first and second rail elements are located on opposing end areas of the plastic body.

12. The guide rail according to claim 11, wherein the first and second rail elements and the support frame are extrusion-coated with the material of the plastic body.

13. The guide rail according to claim 11, wherein the first and second rail elements are connected to the plastic body via a snap connection.

14. The guide rail according to claim 13, wherein the support frame possesses a first set of defined surfaces receiving the first rail element and a second set of defined surfaces receiving the second rail element to position the first and second rail elements at a defined position relative to one another.

15. The guide rail according to claim 9, wherein the at least one rail element and the support frame are extrusion-coated with material of the plastic body.

16. The guide rail according to claim 9, wherein the at least one rail element is connected to the plastic body via a snap connection.

17. The guide rail according to claim 9, wherein the support frame possesses defined surfaces which receive the at least one rail element.

18. The guide rail according to claim 9, wherein the support frame is connected to the at least one rail element via a snap connection.

19. The guide rail according to claim 9, wherein the rail element and metallic support frame are assembled to one another before attaching the plastic body.

\* \* \* \* \*